Jan. 4, 1944.    J. P. DONOVAN ET AL    2,338,320
BROADCASTING APPARATUS
Filed July 16, 1941    2 Sheets-Sheet 1
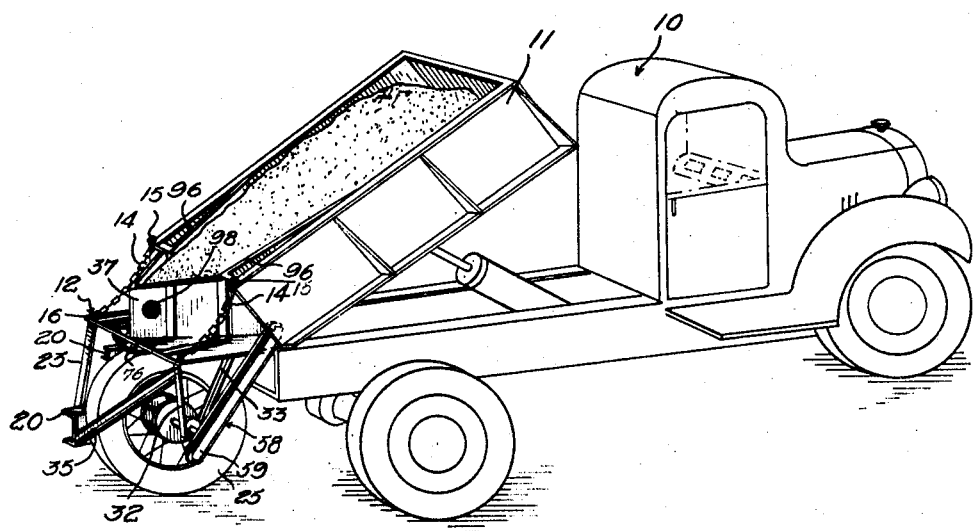
Inventors
JAMES P. DONOVAN
WILLIAM R. MACDONALD
By C. L. Parker
Attorney

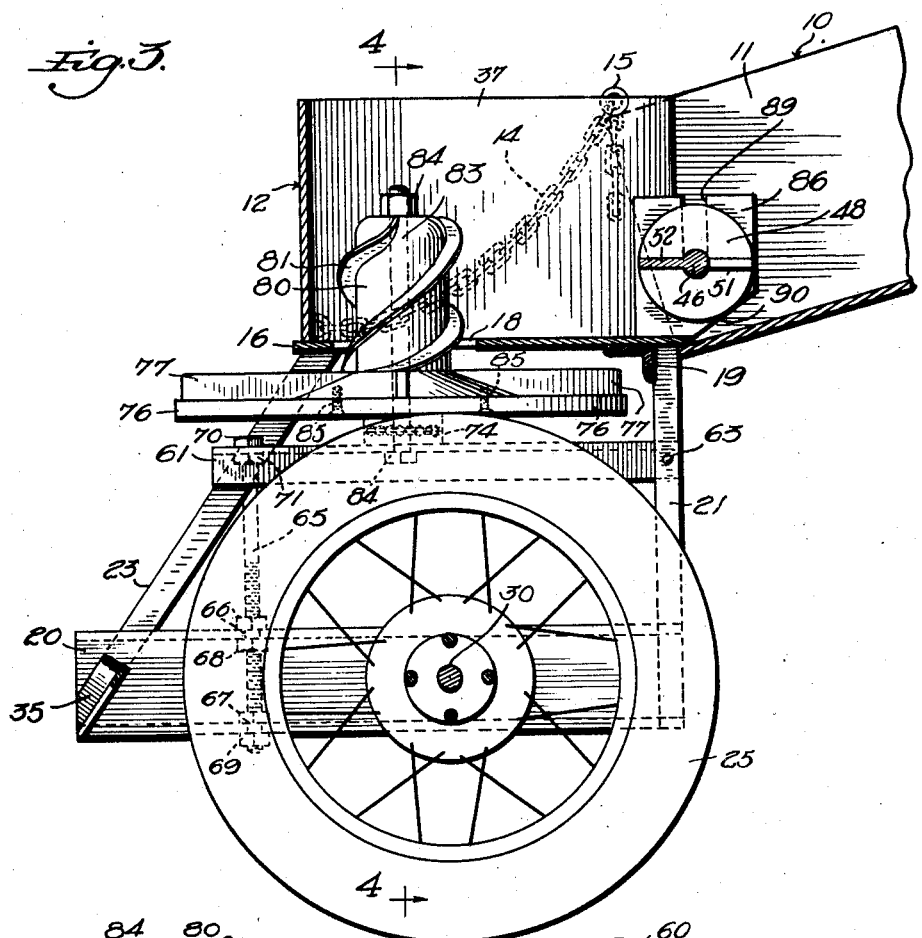

Patented Jan. 4, 1944

2,338,320

UNITED STATES PATENT OFFICE 2,338,320

BROADCASTING APPARATUS

James Patrick Donovan and William Russell MacDonald, Quincy, Mass.

Application July 16, 1941, Serial No. 402,676

15 Claims. (Cl. 275—8)

This invention relates to apparatus for spreading fluent materials such as sand, gravel, peastone, fertilizer, etc., upon the surface of highways, farms, etc., and more particularly to a novel apparatus which is designed to replace the tailgates of vehicles having tiltable bodies, and automatically deliver such materials therefrom at the will of a single operator.

Various apparatus have been designed in the past for broadcasting fluent materials but none of these have been satisfactory from a practical standpoint inasmuch as they were characterized by certain undesirable features. For example, some of these prior apparatus require more than one operator, others require auxiliary power units or power takeoffs, the latter considerably impeding easy removal of the broadcasting unit, while still others are not readily attachable to or detachable from conventional dump truck bodies nor are the broadcasting means provided readily controllable when it is desired to temporarily suspend the broadcasting of the material, thus rendering them undesirable where only occasional use of the apparatus is required.

Accordingly, the chief object of the present invention is to provide a self-contained and self-operated material broadcasting apparatus of novel structure which is designed for use with a truck or other vehicle using a tiltable or dump body.

An important object of the invention is to provide a self-contained unit for ready attachment as a tail-gate to dump trucks, which will automatically unload and spread fluent material such as sand, gravel, etc., from the dump body upon and adjacent the area over which the vehicle passes as desired by the operator thereof.

Another object is to provide a unit which is arranged to be attached as a tail-gate to vehicle dump bodies and which includes spreading or broadcasting means for fluent materials, and other means for delivering such fluent material to the material spreading means.

Another object is to provide a self-contained unit which, when attached as the tail-gate to the dump body of a vehicle, may be operated by raising the dump body of the vehicle to automatically unload and distribute fluent materials at a controlled rate of discharge by a single operator, thus eliminating handling or shoveling of the material and its attendant dangers.

It is a further object to provide a wheel supported unit which is adapted to be attached as a tail-gate to a vehicle dump body and which includes means for directing the discharge of material to the unit, and mechanism positively driven by the wheel to effect delivery of fluent material from the body of the vehicle to a friction driven rotating spreader for broadcasting purposes.

Another object is to provide a unit of novel structure which may be readily attached to or detached from a vehicle dump body to serve as a tail-gate therefor and retain fluent materials therein when the dump body is in the normal horizontal position and which is provided with a wheel adapted to engage the ground to positively drive material delivering and broadcasting means when the dump body has been tilted to an inclined position.

It is another object to provide a unit of novel structure to serve as the tail-gate of a dump vehicle body wherein novel means for protecting and prolonging the life of all the moving parts of the apparatus is provided.

Other objects and advantages of the invention will become apparent during the course of the following description.

In the drawings we have shown one embodiment of the invention,

Figure 1 is a perspective view of the detachable unit in position as the tail-gate of the usual dump truck body, Figure 2 is a plan view of the unit, Figure 3 is a section taken on line 3—3 of Figure 2, parts being shown in elevation, and Figure 4 is a section taken on line 4—4 of Figure 3, parts being shown in elevation.

Referring to the drawings numeral 10 designates a conventional truck having a tiltable or dump body 11 pivotally mounted thereon from which the usual tail-gate has been removed. The trailer unit comprising the present invention and designated as a whole by numeral 12 (Figure 1) is shown connected to the rear of the dump body and replacing the usual tail-gate. The tail-gate trailer unit 12 is pivotally connected to the dump body 11 by utilizing the bottom tail board hinge standards (not shown) which permits relative motion between the trailer unit 12 and the dump body 11 for a purpose to be described. The connection between the unit 12 and the body 11 is completed by means of a pair of chains 14 which secure a horizontal platform 16 of the trailer unit 12 to the corners of the top rear sections of the sides of the dump body 11 by means of hooks 15.

The platform 16 is provided with an opening 18 which is located adjacent its rear edge and centrally of the width thereof for a purpose to be described. The platform 16 is preferably though not necessarily formed of heavy gauge metal and is provided along its front edge with a laterally extending L-shaped reinforcing member 19. A heavy channel member 20 extends from front to rear of the trailer unit 12 beneath the platform 16 and substantially spaced therefrom and is rigidly secured to the L-shaped reinforcing member 19 by means of a vertically extending channel section 21.

Suitable bracing members 23 and 24 extend from the left hand corners of the floor 16 (as viewed in Figure 2) to the respective ends of the channel member 20. A supporting wheel 25 is provided for the trailer unit and is rotatable on a spindle 27 carried by the channel member 20 (Figure 4). The wheel 25 is provided with a pneumatic tire and a special hub 28 which has integral therewith a shaft 30 supported adjacent its right end (Figure 4) in a suitable bearing 31 suspended from the right hand corners of the platform 16 by means of the two angle members 32 and 33. To insure a strong and rigid structure, an additional angle member 35 connects the channel member 20 with the right hand rear corner of the platform 16 (Figure 2).

The platform 16 is provided with a V-shaped pair of sides 37 formed of heavy sheet metal welded or otherwise secured thereto. The two sides 37 have a height equal to the sides of the dump body 11 and are suitably braced at spaced points by means of strap metal angle members 39. It will be noted (Figure 2) that the opening 18 is located just within the apex of the V formed by the sides 37. The front ends of the sides 37 are provided with laterally extending portions 39 provided with braces 40 extending from the top edges of the side portions 39 to lateral extensions 42 of the platform 16 which are suitably secured thereto by welding or other means.

A pair of antifriction bearings 44 is provided on the front faces of the lateral extensions 39 and support therein a laterally extending shaft 46 which has integral therewith a pair of opposed screw or worm conveyors 48 and 49 and a pair of paddles 51 and 52. It will be obvious that rotation of the shaft 46 in a counter-clockwise direction as viewed from the left in Figure 2 will feed any fluent materials about the worms 48 and 49 toward the center of the platform 16 where such material will be thrown by the paddles 51 and 52 toward the opening 18.

The shaft 46 and its opposed worms 48 and 49 have a driving connection with the wheel 25 by means of sprockets 54 and 55 which are mounted respectively on shafts 46 and 30 and connected by a roller chain 56. The sprockets 54 and 55 and their connecting chain 56 are encased in an oil tight casing 58 formed of complementary sections 59 secured together by bolts 60. It will now be apparent that when the wheel 25 is permitted to bear or rest upon the roadway, motion of the towing vehicle will cause rotation of the wheel which will be transmitted by means of the sprockets 54 and 55 and the connecting chain 56 to the shaft 46 and its opposed worms 48 and 49.

Referring to Figures 3 and 4, it will be seen that a channel member 61 is pivotally supported at one extremity by the vertical member 21 as at 63 and is supported at its other extremity by a vertically arranged screw 65 which has been threaded through openings 66 and 67 in the channel member 20 and provided with lock nuts 68 and 69. The head 70 of the screw 65 engages against the top of the web portion of the members 61 and a lock nut 71 is threaded on the screw 65 and engages against the bottom of such web.

A suitable antifriction thrust bearing 74 is secured upon the channel 61 intermediate its ends and supports a heavy metallic disk or plate 76 having spaced radially extending fins or vanes 77 which terminate just short of a vertically extending hub portion 80 having spiral blades 81 secured thereto or integral therewith. The hub 80 extends upwardly through the opening 18 and the hub 80 and the disk 76 are mounted upon an axially extending shaft 83 having nuts 84 on its upper and lower ends. The hub portion 80 is secured to the disk 76 by countersunk screws 85. The spiral blades 81 are arranged on the hub 80 so as to cause any fluent material which is thrown thereagainst by the paddles 51 and 52 to be fed downwardly upon the disk 76 upon rotation of the assembly.

The disk 76 and its hub 80 together comprise the broadcasting unit. It will be noted that the hub may be removed to facilitate the removal of the disk which arrangement permits the replacement of either element alone as required. It will also be noted (Figure 3) that the top of the outer circumference of the tire on the wheel 25 bears against the surface of the disk 76 so that upon movement of the trailer, rotation of the wheel 25 will cause rotation of the disk 76 by means of the frictional engagement therebetween. The force with which the disk 76 bears upon the wheel 25 may be adjusted by means of the nuts 70 and 71 so as to secure at all times efficient frictional engagement between the wheel and the disk to ensure rotation of the broadcasting unit.

The V-shaped sides 37 are provided with a pair of vertical members 86 which define the sides of the area of the platform 16 upon which fluent material is to be received. These side members 86 are welded or otherwise secured to the platform and to the sides 37 as at 87 and are provided with cutout portions 89 through which the shaft 46 extends. The lower front corners of the side sections 86 have been cut away as at 90 so that the trailer unit 12 may pivot freely with respect to the dump body 11 as will be explained. These side members 86 have a second function, that of acting as guards for the opposed worm sections 48 and 49 and the paddles 51 and 52. When relative pivoting of the trailer unit 12 and the dump body 11 occurs in a direction toward each other, the side sections 86 will contact with the bottom of the truck body to act as a stop, thus preventing damage to the feeding screws 48 and 49 and ensuring continuous feeding if the wheel 25 is contacting the surface of the ground.

The trailer unit 12 is connected to the bottom tail-board hinge standards by means of bracket lugs 92 which are preferably though not necessarily formed integral with the caps of the bearings 44 supporting shaft 46. It has been found desirable in actual practice to provide a pair of rearwardly converging members 96 (Figure 1) on either side of the floor of the dump body of the truck and at the rear thereof so as to assist in guiding the fluent material when the dump body 11 is tilted or elevated. These members 96, which may be formed of wood, metal or any desired material of sufficient strength for the purpose, form together a chute which directs the flow of fluent material to the platform 16 within the area bounded by the V-shaped sides 37 and the side portions 86. The latter extend inwardly and slightly past the ends of the converging members 96 so as to cooperate with them in properly directing the flow of material upon the platform 16 regardless of the relative angular positions of the trailer unit 12 and the truck body 11. The chute forming members 96 may be placed in the rear of the truck dump body 11 before loading and they may be secured thereto. It has been also found desirable to provide the rear faces of the sides 37 with light reflecting elements 98 of substantial size so as to give warning to motors approaching from the rear at night.

The operation of the apparatus is as follows:

Although it will be apparent that the trailer unit is capable of use with fluent materials of many types, including fertilizer for distribution over farm lands, the operation of the trailer unit will be described in connection with its use as a sand spreader or broadcaster for the surfaces of highways.

When it is desired to attach the trailer unit to the dump body of a conventional truck, the tail-gate of the body is removed and the tail-gate trailer unit 12 is moved against the rear of the truck in such a manner that the open or front end of the V-shaped sides 37 of the trailer unit abuts and encloses the rear end of the truck body. In this position the platform 16 of the trailer unit 12 will be slightly above and within the end of the dump body to which it is hingedly connected to the bottom tail-board hinge standards by means of the lugs 92. The trailer unit is further secured to the dump body by means of the chains 14 which serve two important functions. These chains act as a safe guard against accidental disconnection of the tail-gate trailer unit from the rear of the dump truck body and further and more important, are the means by which the trailer unit is lifted off the roadway when the dump body is lowered when it is not desired to sand any particular parts thereof, it being obvious that the lifting of the trailer unit 12 from the roadway stops the discharge of said material therefrom inasmuch as rotation of the dyriving wheel 25 will stop.

After the chains have been connected to the hooks on the rear of the dump body of the truck in such a manner that when the dump body is tilted (Figures 1 and 3) the wheel 25 will rest upon the surface of the roadway, the chute forming members 96 should be positioned in the truck. The members 96 will of course be resting within the dump body in the proper position against the sides thereof. When being loaded with sand, the truck body will be in a horizontal position thus supporting the trailer unit above the surface of the roadway by means of the chains 14.

When the operator of a dump truck equipped with the present invention desires to commence sanding a certain strip of roadway, he causes the dump body of the truck to be elevated or inclined thus lowering the wheel of the trailer unit into contact with the surface of the roadway. Due to the pivotal connection between the trailer unit 12 and the dump body 11 and to the inclined lower corners 90 of the tail-gate side sections 86 which protect the screws 48 and 49 from injury, the inclination of the dump body 11 may be increased as desired after the wheel 25 has contacted the road surface.

As the load of sand contained in the dump truck body commences sliding rearwardly due to the inclination thereof, it will be guided by the chute forming members 96 within the area defined by the V-shaped sides 37 and upon the surface of the platform 16 of the trailer unit 12. When the wheel 25 contacts the surface of the roadway, it will of course be rotated and, as previously described, will rotate the shaft 46. The outer circumference of the tire on the wheel 25 will also frictionally engage the lower surface of the disk 76 causing it to rotate and to broadcast by centrifugal action all material which is fed to it by the action of the opposed worms 48 and 49 and the paddles 51 and 52.

Rotation of the wheel 25 drives the opposed feed screws 48 and 49 so that the sand being discharged on the platform of the trailer unit 12 is fed toward the center thereof and then thrown rearwardly toward the opening 18 by the paddles 51 and 52. The sand so propelled to the opening 18 will drop downwardly upon the rotating disk 76 and this movement is assisted by the spiral vanes 81 on the hub 80. The action of these spiral vanes 81 is particularly desirable when a load of damp sand is being broadcast from the dump body by means of the trailer unit 12.

Inasmuch as the rotation of the disk 76 is effected by direct frictional engagement of the wheel 25, the speed of rotation of the disk varies as the speed at which the trailer unit is towed along the surface of the roadway. Obviously, the higher the speed of rotation of the disk 76 the greater the throw of the sand therefrom. Accordingly, the operator of the truck can control the size of the area over which broadcasting of the sand is accomplished by speeding up or slowing down the truck. When the truck operator approaches spots which are not to be sanded, he drops the dump body a sufficient distance to lift the wheel 25 clear of the roadway, thus suspending the broadcasting of the sand. The sanding may be resumed when desired by elevating the dump body 11 so that the wheel 25 again rolls along the roadway to drive the feeding and broadcasting apparatus as explained. The platform 16 retains sufficient sand so that broadcasting is immediately resumed when the wheel again bears on the roadway and even before the sand has slid back onto the platform 16 from the dump body.

From the foregoing description of the operation of the apparatus it will be apparent that the entire sand broadcasting operation can be effected automatically by a single operator in an expeditious and efficient manner without leaving his seat. Moreover, the present invention provides in one simple self-contained unit a tail-gate readily interchangeable with the conventional tail-gate of truck bodies, chutes for guiding the discharge of the material from the truck onto the trailer unit, and mechanism automatically operative upon roadway contact of the supporting wheel to feed the material from the tail-gate platform and broadcast it upon the surface of a roadway.

It is to be understood that the form of our invention herewith shown and described is to be taken as a preferred example of the same and that various changes in the shape, size and arrangement of parts may be resorted to without departure from the spirit of the invention or the scope of the subjoined claims.

We claim:

1. A broadcasting apparatus for a vehicle having a tiltable body comprising a frame pivotally connectible to the body, a supporting wheel for said frame arranged to engage the ground when the body is tilted, a material receiving platform mounted on said frame, a pair of rearwardly converging sides fixed to said platform and closing the open end of the body, material feeding and broadcasting means mounted on said frame and having driving connection with said wheel, and means connecting the body and the platform for maintaining said wheel in an inoperative position above the ground when the body is in its normally horizontal position.

2. A broadcasting apparatus for a vehicle having a tiltable body comprising a frame pivotally connectible to the body, a material receiving platform mounted on said frame, a pair of rearwardly converging sides fixed to said platform and closing the open end of the body, a supporting wheel for said frame, means connecting the body and said platform for maintaining the wheel above the ground when the body is in its normally horizontal position, and material feeding and distributing means mounted on said frame and having driving connection with said wheel, said feeding and broadcasting means being operated when the body is tilted and the ground is engaged by said wheel when the vehicle is in motion.

3. A broadcasting apparatus for a vehicle having a tiltable body comprising a frame pivotally connectible to the body, a supporting wheel for said frame arranged to engage the ground when the body is tilted, flexible means for maintaining said wheel above the ground when the body is in its normally horizontal position, a material receiving platform having an opening therein mounted on said frame, a pair of sides fixed to said platform and converging to an apex about said opening to close the open end of the body, and a rotatable disk mounted beneath said opening on said frame and having a driving connection with said wheel, said disk being operative when the body of the moving vehicle is tilted and the ground is engaged by said wheel to broadcast material received from the tilted body.

4. A broadcasting apparatus for a vehicle having a tiltable body comprising a frame pivotally connectible to the body, a supporting wheel for said frame arranged to engage the ground when the body is tilted, flexible means connecting the body and said frame for maintaining the wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the tilted body to the center of said platform and toward said opening, a rotatable disk mounted beneath said opening on said frame and having frictional engagement with said wheel, and means connecting said feeding means with said wheel for rotation thereby when the body of the moving vehicle is tilted and the wheel is in the ground engaging position.

5. A broadcasting apparatus for a vehicle having a tiltable body comprising a frame pivotally connectible to the body, a supporting wheel for said frame arranged to engage the ground when the body is tilted, flexible means connecting the body and said frame for maintaining the wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the tilted body to the center of said platform and toward said opening, a rotatable disk mounted beneath said opening on said frame and having frictional engagement with said wheel, means connecting said feeding means with said wheel for rotation thereby when the body of the moving vehicle is tilted and the wheel is in the ground engaging position, said material feeding means comprising a shaft, a pair of opposed worm conveyors integral therewith, and a plurality of oppositely disposed paddles mounted on said shaft and centrally thereof.

6. A broadcasting apparatus for a vehicle having a tiltable body comprising a frame pivotally connectible to the body, a supporting wheel for said frame arranged to engage the ground when the body is tilted, flexible means connecting the body and said frame for maintaining said wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material from the body to the center of said platform and toward said opening, a plurality of guards mounted on opposite sides of said platform adjacent said feeding means and arranged to abut the floor of the body to ensure free operation of the feeding means during relative motion of the body and the frame, a rotatable disk mounted beneath said opening on said frame and having a frictional engagement with said wheel, and means connecting said material feeding means with said wheel for rotation thereby when the body of the moving vehicle is tilted and the wheel is in a ground engaging position.

7. A broadcasting apparatus for a vehicle having a tiltable body comprising a frame pivotally connectible to the body, a supporting wheel for said frame arranged to engage the ground when the body is tilted, flexible means connecting the body and said frame for maintaining said wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the body to the center of said platform and toward said opening, a rotatable disk mounted beneath said opening on said frame and having a frictional engagement with said wheel, material feeding means removably mounted on said disk and extending through said opening, and means connecting said platform material feeding means with said wheel for rotation thereby when the body of the moving vehicle is tilted and the wheel is in a ground engaging position.

8. A broadcasting apparatus for a vehicle having a tiltable body comprising a frame pivotally connectible to the body, a supporting wheel for said frame arranged to engage the ground when the body is tilted, flexible means connecting the body and said frame for maintaining said wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the body to the center of said platform and toward said opening, a rotatable disk mounted beneath said opening on said frame and having a frictional engagement with said wheel, material feeding means removably mounted on said disk and extending through said opening, and means connecting said platform material feeding means with said wheel for rotation thereby when the body of the moving vehicle is tilted and the wheel is in a ground engaging position, said second named material feeding means comprising a vertically extending hub portion rigidly secured to said disk and having spiral blades arranged to feed material downwardly through said opening upon rotation of the disk 9. A broadcasting apparatus for a vehicle having a tiltable body and chute forming members on the floor thereof, comprising a frame pivotally connectible to the body, a supporting wheel for said frame arranged to engage the ground when the body is tilted, flexible means connecting the body and said frame for maintaining said wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the body to the center of said platform and toward said opening, a plurality of guards mounted on opposite sides of said platform adjacent said feeding means and arranged to abut the floor of the body to ensure free operation of the feeding means during relative motion of the body and the frame, a rotatable disk mounted beneath said opening on said frame and having frictional engagement with said wheel, and means connecting said material feeding means with said wheel for rotation thereby when the body of the moving vehicle is tilted and the wheel is in a ground engaging position, said guards being constructed and arranged to limit laterally the material receiving area of said platform and cooperate with the chute forming members to direct the material upon the material receiving area of the platform.

10. In combination with a vehicle having a tiltable body and chute forming members upon the floor thereof, a broadcasting apparatus comprising a frame pivotally connectible to the body, a supporting wheel for said frame arranged to engage the ground when the body is tilted, a material receiving platform mounted on said frame and forming substantially a continuation of the floor of the body, a pair of rearwardly converging sides fixed to said platform and closing the open end of the body, a pair of side members mounted upon opposite sides of the platform to limit laterally the material receiving area of said platform, said side members being adjacent and extending slightly within the chute forming members to guide the discharge of material to said platform, material feeding and broadcasting means arranged on said frame and having operative driving connection with said wheel when the body of the moving vehicle is tilted and the wheel is in a ground engaging position, and flexible means connecting the body and said platform for maintaining said wheel in an inoperative position above the ground when the body is in its normally horizontal position.

11. In combination with a vehicle having a tiltable body, a broadcasting apparatus comprising a frame pivotally connectible to the body, a supporting wheel for said frame arranged to engage the ground when the body is tilted, a material receiving platform mounted on said frame, a pair of rearwardly converging sides fixed to said platform and closing the open end of the body, material feeding and broadcasting means mounted on said frame and having driving connection with said wheel, and means connecting the body and the platform for maintaining said wheel in an inoperative position above the ground when the body is in its normally horizontal position.

12. In combination with a vehicle having a tiltable body, a broadcasting apparatus comprising a frame pivotally connectible to the body, a supporting wheel for said frame arranged to engage the ground when the body is tilted, flexible means for maintaining said wheel above the ground when the body is in its normally horizontal position, a material receiving platform having an opening therein mounted on said frame, a pair of sides fixed to said platform and converging to an apex about said opening to close the open end of the body, and a rotatable disk mounted beneath said opening on said frame and having a driving connection with said wheel, said disk being operative when the body of the moving vehicle is tilted and the ground is engaged by said wheel to broadcast material received from the tilted body.

13. In combination with a vehicle having a tiltable body, a broadcasting apparatus comprising a frame pivotally connectible to the body, a supporting wheel for said frame arranged to engage the ground when the body is tilted, flexible means connecting the body and said frame for maintaining the wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the tilted body to the center of said platform and toward said opening, a rotatable disk mounted beneath said opening on said frame and having frictional engagement with said wheel, means connecting said feeding means with said wheel for rotation thereby when the body of the moving vehicle is tilted and the wheel is in a ground engaging position, said material feeding means comprising a shaft, a pair of opposed worm conveyors integral therewith, and a plurality of oppositely disposed paddles mounted on said shaft and centrally thereof.

14. In combination with a vehicle having a tiltable body, a broadcasting apparatus comprising a frame pivotally connectible to the body, a supporting wheel for said frame arranged to engage the ground when the body is tilted, flexible means connecting the body and said frame for maintaining said wheel above the ground when the body is in its normally horizontal position, a material receiving platform having an opening therein mounted on said frame, a pair of sides fixed to said platform and converging to an apex about said opening to close the open end of the body, material feeding means mounted on said platform and arranged to move material received from the tilted body to the center of said platform and toward said opening, a plurality of guards mounted on opposite sides of said platform adjacent said feeding means and arranged to abut the floor of the body to ensure free operation of the feeding means during relative motion of the body and the frame, a rotatable disk mounted beneath said opening on said frame and having a frictional engagement with said wheel, and means connecting said material feeding means with said wheel for rotation thereby when the body of the moving vehicle is tilted and the wheel is in a ground engaging position.

15. A broadcasting apparatus for a vehicle having a tiltable body, comprising a structure pivotally connectible to the body, said structure having a platform provided with a forward edge positioned substantially in contact with the top surface of the bottom of the tiltable body adjacent the rear edge thereof, said structure further comprising a pair of walls having their forward edges arranged in said body substantially in contact with the respective sides thereof, said walls converging rearwardly into connection with each other and said platform being provided with an opening forwardly of the connected edges of said walls, means for broadcasting material dropping through said opening, said means comprising a wheel engageable with the surface of the ground, and means limiting pivotal movement of said structure downwardly with respect to said tiltable body whereby downward swinging of the latter will lift said wheel from engagement with the ground.

JAMES PATRICK DONOVAN.
WILLIAM RUSSELL MacDONALD.